(12) United States Patent
Ratasuk et al.

(10) Patent No.: US 7,237,170 B2
(45) Date of Patent: Jun. 26, 2007

(54) PACKET TRANSMISSION REDUNDANCY SELECTION APPARATUS AND METHOD

(75) Inventors: Rapeepat Ratasuk, Schaumburg, IL (US); Amitava Ghosh, Buffalo Grove, IL (US); Weimin Xiao, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 447 days.

(21) Appl. No.: 10/959,832

(22) Filed: Oct. 6, 2004

(65) Prior Publication Data

US 2006/0075319 A1    Apr. 6, 2006

(51) Int. Cl.
*H04L 1/18*    (2006.01)
*H03M 13/00*    (2006.01)
(52) U.S. Cl. .................................................. 714/748
(58) Field of Classification Search ................. 714/748
See application file for complete search history.

(56) References Cited

U.S. PATENT DOCUMENTS

| | | | |
|---|---|---|---|
| 6,574,218 | B1 | 6/2003 | Cooklev |
| 6,754,222 | B1 | 6/2004 | Joung et al. |
| 6,757,250 | B1 | 6/2004 | Fayad et al. |
| 6,781,987 | B1 | 8/2004 | Stewart |
| 6,801,532 | B1 | 10/2004 | Anandakumar et al. |
| 6,819,658 | B1 | 11/2004 | Agarwal et al. |
| 2004/0047321 | A1* | 3/2004 | Bui ........................... 370/338 |

FOREIGN PATENT DOCUMENTS

DE    1 657 844 A1 *    5/2006

OTHER PUBLICATIONS

Samir Kallel, Complementary punctured convolutional (CPC) codes and their use in hybrid ARQ schemes, 1993, IEEE, p. 186-189.*
Peng et al., Performance of Hybrid ARQ techniques based on Turbo codes for high speed packet transmission, Sep. 2002, IEEE 7th Symp. on Spread-Spectrum Tech. & Appl., Prague, Czech Republic, p. 682-686.*
3rd Generation Partnership Project; Technical Specification Group Radio Access Network; High Speed Downlink Packet Access: Physical Layer Aspects (Release 5), 3GPP TR 25.858 v5.0.0 (Mar. 2002), 31 pp.
3rd Generation Partnership Project; Technical Specification Group Radio Access Network; Multiplexing and channel coding (FDD) (Release 5), 3GPP TR 25.212 v5.5.0.

* cited by examiner

*Primary Examiner*—Shelly Chase

(57) ABSTRACT

A high speed downlink packet access communication system method that supports a plurality of redundancy variations that are characterized by at least a first parameter that comprises an indicator regarding self-decodability of a corresponding packet and a second parameter that comprises a selection of a particular redundancy version from amongst a plurality of candidate redundancy versions. Pursuant to a preferred approach, and upon determining a need to transmit redundant information as corresponds to a given packet, one automatically selects, for at least one of the first and second parameters, a specific value from amongst a plurality of candidate values and then uses the specific value to transmit the redundant information.

22 Claims, 2 Drawing Sheets

PACKET TRANSMISSION REDUNDANCY SELECTION APPARATUS AND METHOD

TECHNICAL FIELD

This invention relates generally to data packet transmissions and more particularly to redundancy as regards such transmissions.

BACKGROUND

Data transmission, including the transmission of packets of data, comprises a well-understood area of endeavor. In many cases, and particularly when transmitting data via a wireless pathway, not all of the data may be properly received. For example, pathway conditions may be sufficiently poor so as to distort or overwhelm one or more transmission symbols as correspond to the underlying data.

Redundancy encompasses the general area of attempting to avoid or at least ameliorate such problems by transmitting more than just the basic data as described above. For example, by sending an entire message twice, or three times more, one can increase the likelihood that at least one of the transmissions will pass without undue compromise. Such a simplistic technique, of course, would be very consumptive of the communication pathway itself and could greatly reduce the total number of unique messages that could be supported by such a pathway. Consequently various other redundancy schemes have been proposed to increase the likelihood of effecting an adequate exchange of information while simultaneously minimizing usage of the supporting communication resources.

For example, present High Speed Downlink Packet Access (HSDPA) standards specify use of a hybrid-automatic repeat request (H-ARQ) scheme that makes use of a specific rate-matching algorithm. The two fundamental forms of H-ARQ are Chase combining and Incremental Redundancy (IR). The first packet data transmission will typically comprise both information bits and parity bits as correspond to the information bits. In Chase combining, each re-transmission repeats the first transmission or part of it. In IR, each retransmission provides new parity bits from the mother code to build a lower effective code rate, where the effective code rate is determined by dividing the number of unique information bits received by the number of unique information and parity bits received.

For HSDPA, this particular approach permits use of different versions of the H-ARQ redundancy algorithm. In particular, a so-called S parameter is used to indicate whether a given packet is self-decodable by itself and a so-called R parameter indicates the start point for an included stream of parity bits (and thereby in effect comprises a redundancy version selection indicator). Selection of these parameters corresponds to selection of a corresponding H-ARQ redundancy algorithm from amongst a potential plurality of candidates.

These parameters are presently selected on a relatively static basis. While a given user may make a proper (i.e., efficient) selection of these parameters in a given instance, or for a given point in time, transmission conditions can and will change (sometimes quickly and sometimes dramatically). Such changes can quickly render a given choice of parameters sub-optimum. As a result, this capability of selecting a particular approach to redundancy from amongst a plurality of candidate options does not always necessarily lead to an otherwise hoped-for improvement with respect to data throughput or efficiency.

BRIEF DESCRIPTION OF THE DRAWINGS

The above needs are at least partially met through provision of the packet transmission redundancy selection apparatus and method described in the following detailed description, particularly when studied in conjunction with the drawings, wherein.

Figure 1:
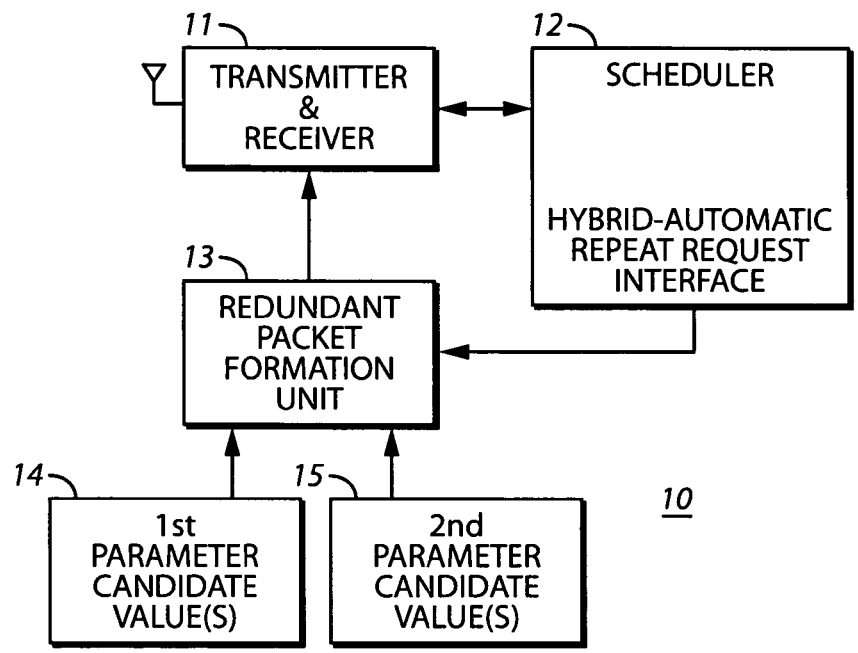
FIG. 1 comprises a block diagram as configured in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

Generally speaking, pursuant to these various embodiments, upon transmitting at least a first packet of data, and upon determining a need to transmit redundant information as corresponds to that first packet of data, an exemplary process can automatically select, for at least one of a first and second parameter as serve to characterize the transmitted data packets, a specific value from amongst a plurality of candidate values. That specific value is then preferably used to transmit the redundant information.

Pursuant to one embodiment, the first parameter can comprise an indicator regarding self-decodability of a corresponding packet and the second parameter can comprise a selection of a particular redundancy version. These teachings can be employed even when the first packet of data solely comprises information bits, but in a preferred approach the first packet of data will typically comprise both information bits and parity bits as correspond to the information bits.

Pursuant to a preferred approach, the first parameter is automatically selected from amongst a plurality of candidate values as corresponds to a most efficient trade-off as between decreases in the effective coding rates relative to a corresponding amount of transmitted bits. That is, if the additional transmitted bits will only lead to a disproportionably small decrease in the effective coding rate, then the first parameter is preferably set. Also pursuant to a preferred approach, the second parameter is automatically selected from amongst a plurality of candidate values by incrementing a present value. If this incremented value is greater than the maximum possible value, it is divided by the maximum possible value with the remainder becoming the new value.

So configured, a particular approach to redundancy can be dynamically selected using near-term relevant information to likely permit selection of an efficient, and possibly a most efficient, redundancy approach or technique. This in turn can aid in facilitating increased data throughput and hence an improved use of system resources in concert with an improved user experience.

These and other benefits may become more evident upon making a thorough review and study of the following detailed description. Referring now to the drawings, and in particular to FIG. 1, an apparatus 10 suitable for use in a high speed downlink packet access communication system (such as but not limited to a wireless system) that supports a plurality of redundancy variations that are characterized by at least a first parameter that comprises an indicator regarding self-decodability of a corresponding packet and a second parameter that comprises a selection of a particular redundancy version from amongst a plurality of candidate redundancy versions will be described.

This apparatus 10 comprises a transmitter 11 (and preferably also comprises a receiver as well) that facilitates wireless communications with and via the high speed downlink packet access communication system. Various such transmitters are known and understood in the art and others will no doubt be developed in the future. As those skilled in the art will readily understand such transmitters, and further given that these teachings are not particularly sensitive to selection of any particular transmitter, further description and details regarding such a transmitter need not be provided here save to note that, in a preferred embodiment, the transmitter 11 will have the native or accessible capability of transmitting data packets that comprise both information bits as well as parity bits that correspond to the information bits.

In a preferred embodiment this apparatus 10 further comprises a scheduler 12 and a redundant packet formation unit 13, both of which operably couple to the transmitter 11 and to each other. The scheduler preferably performs the following functions—scheduling all users within a cell, servicing priority queues, determining the H-ARQ entity and the queue to be serviced, scheduling new transmissions and retransmissions, and determining the redundancy version. The scheduler 12 also preferably features a hybrid-automatic repeat request (H-ARQ) interface that operates in concert with both the redundant packet formation unit 13 and the transmitter 11. So configured, and in accordance with a preferred practice, the redundant packet formation unit 13 is responsive to the hybrid-automatic repeat request interface of the scheduler 12 and provides an output that couples to the transmitter 11 to facilitate automatic selection, for at least one of the first and second parameters noted above, a specific value from amongst a plurality of candidate values (such as, for example, a first parameter candidate value (or values) 14 and/or a second parameter candidate value (or values) 15) and then using that specific value when transmitting redundant information via the transmitter 11.

Pursuant to one approach, this automatic selection can comprise selecting the specific value as a function, at least in part, of a desired ratio of parity bits to coded bits as comprises the information and parity bits. In a preferred approach, this can comprise determining effective coding rates as will likely correspond to use of various of the plurality of candidate values (such as, for example, candidate values as correspond to the first parameter) that represent a most efficient trade-off between a decrease in the effective coding rate relative to a corresponding amount of transmitted bits and then selecting a specific value (for example, for the second parameter). Such a specifically selected value (or values) is then used when transmitting redundant information via the transmitter 11. In a preferred embodiment, both the first and second parameters as noted above are selected in this fashion.

Figure 2:
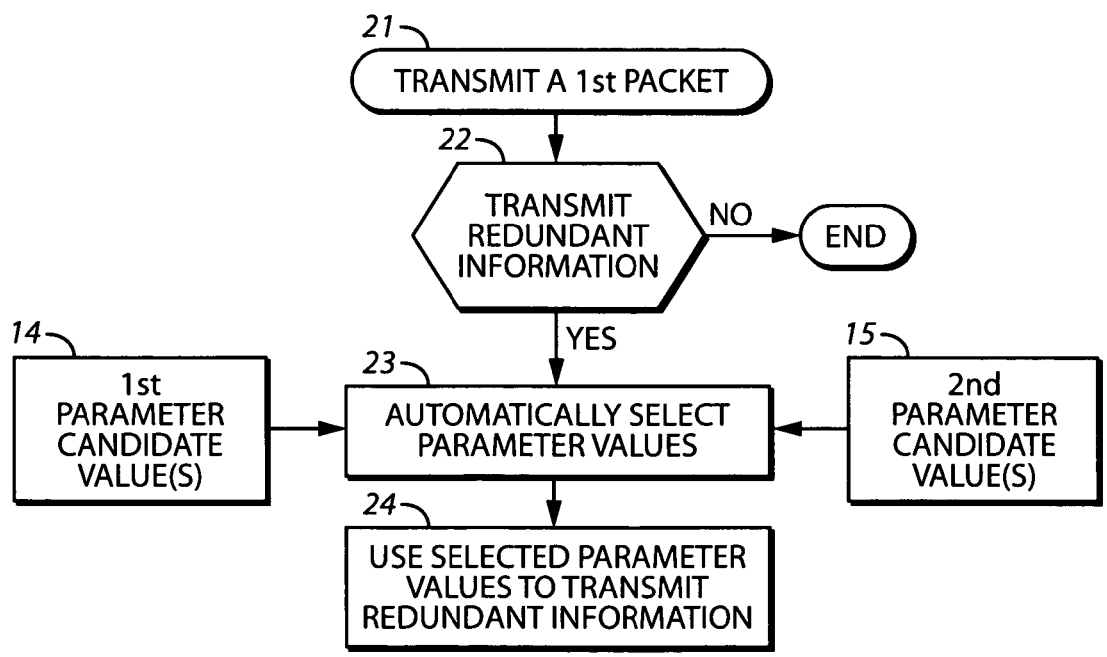
FIG. 2 comprises a flow diagram as configured in accordance with various embodiments of the invention.

So configured, the teachings set forth herein are readily practiced in a convenient and effective manner, though those skilled in the art will appreciate that other supporting platforms would no doubt also suffice in many instances. In particular, and referring now to FIG. 2, a process 20 to advantageously utilize such an embodiment (or such other platform as may be desired), following transmission 21 of a first packet (such as a data packet that preferably comprises both information bits and parity bits as corresponds to the information bits), determines 22 whether a need exists to transmit redundant information as corresponds to the first packet. This determination 22 can be facilitated in various ways. Pursuant to one approach, this determination can be based, at least in part, on receiving a corresponding hybrid-automatic repeat request message in accordance with well understood prior art practice. When no such need exists, this process 20 can end (and, of course, can be later recalled upon transmitting a subsequent packet).

Upon determining 22 the existence of such a need, however, the process 20 provides for automatic selection 23, for at least one of the first and second parameters, of a specific value from amongst a plurality of candidate values (such as the above mentioned first parameter candidate value (or values) 14 and the second parameter candidate value (or values) 15). In a preferred approach, this determination 22 can comprise selecting a specific value for one or the other (or both) of these parameters as a function, at least in part, of a desired ratio of parity bits to coded bits as comprise the information and parity bits.

Figure 3:
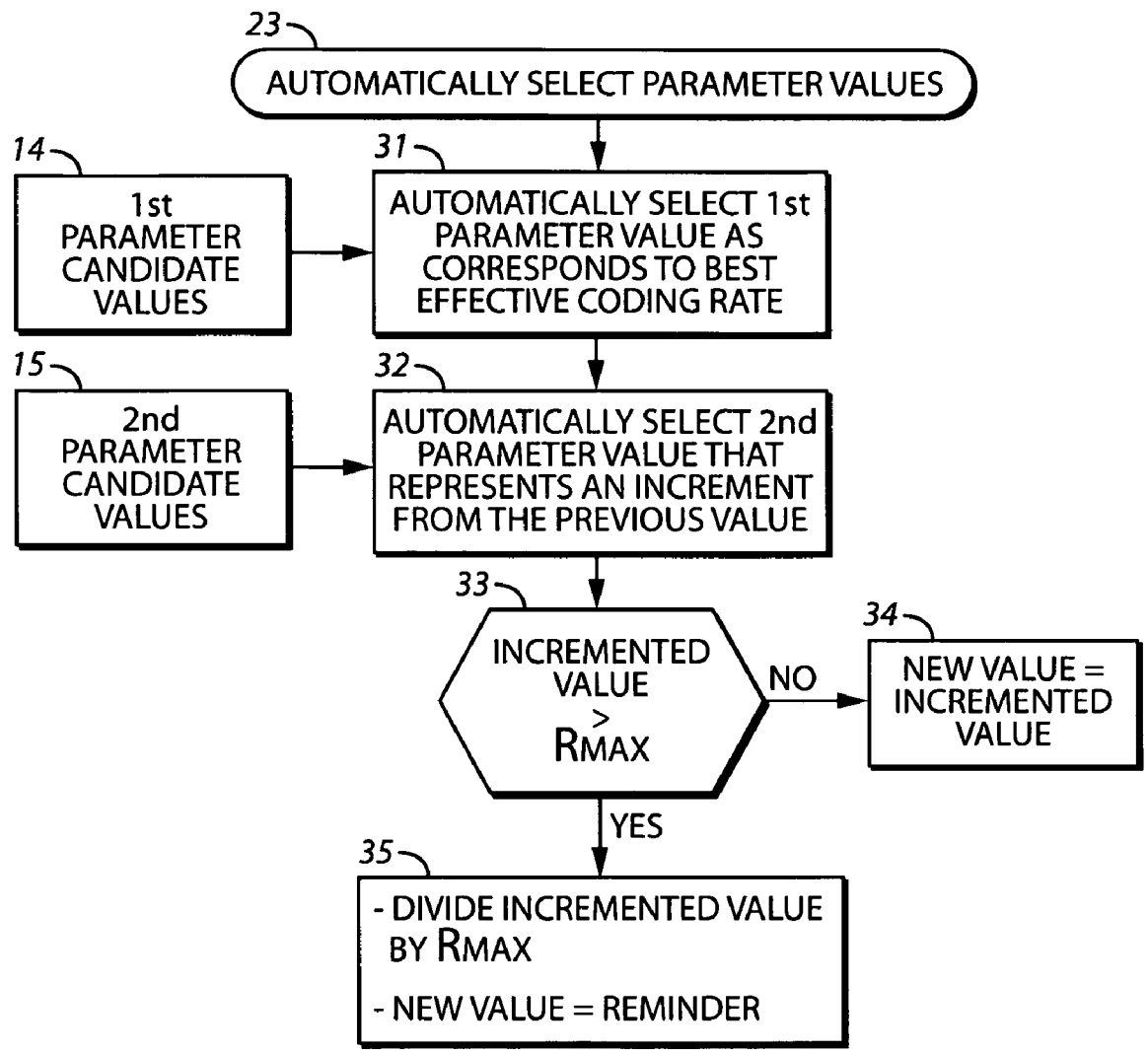
FIG. 3 comprises a detail flow diagram as configured in accordance with various embodiments of the invention.

With momentary reference to FIG. 3, this automatic selection 23 of parameter values can preferably encompass automatically selecting 31 a first parameter value that represents a most efficient trade-off between a decrease in the effective coding rate relative to a corresponding amount of transmitted bits. This selection 23 process can then preferably entail automatically selecting 32 for the second parameter a specific value (preferably from amongst a plurality of candidate values) that represents an increment from the previous value. When this incremented value is less than the maximum possible value $R_{MAX}$ 33, the new value is set 34 to equal the incremented value. When this incremented value is greater than the maximum possible value 33, it is divided 35 by the maximum possible value $R_{MAX}$ with the remainder becoming the new value.

Referring again to FIG. 2, this process 20 then effects usage 24 of the specific value (or values) to transmit the redundant information. For example, both the specific values as selected for the first parameter and the second parameter as per these teachings can then be used to transmit the redundant information by, for example, informing and/or controlling the content and formation of the redundant information packet (via, for example, the redundant packet formation unit noted above).

For purposes of illustration, a more detailed example will now be provided. This illustrative example uses High Speed Downlink Packet Access (HSDPA) as is presently proposed for high-speed packet access on the downlink of a Universal Mobile Telecommunications System (UMTS) Wideband-Code Division Multiple Access (W-CDMA) system. HSDPA features adaptive modulation and coding, Hybrid-Automatic Repeat Request (H-ARQ), and fast scheduling. In current HSDPA standards, H-ARQ is implemented via a rate-matching algorithm presented in Release 99 of the UMTS specifications. As noted above, two parameters, s (for self-decodable) and r serve to select and distinguish different versions of the H-ARQ redundancy algorithm in such an approach. Their method of selection, however, is not specified in the standards. The following illustrative example demonstrates how the present teachings can be beneficially employed in such a setting.

The parameters of the second rate matching stage depend on the value of the Redundancy Version (RV) parameters s and r. The parameter s can take the value 0 or 1 to distinguish self-decodable (s=1) and non self-decodable (s=0) transmissions. The parameter r (range 0 to $r_{max}$–1) changes the initial error variable $e_{ini}$ in the case of puncturing. In case of repetition, both parameters r and s change the initial error variable $e_{ini}$. The parameters X, $e_{plus}$ and $e_{minus}$ are calculated as per Table 1 below. The rate matching parameter $e_{ini}$ is calculated for each bit stream according to the RV parameters r and s using $$e_{ini}(r) = \{[X_i - (r \cdot e_{plus}/r_{max}) - 1] \bmod e_{plus}\} + 1$$

in the case of puncturing and $$e_{ini}(r) = \{[X_i - ((s + 2 \cdot r) \cdot e_{plus}/(2 \cdot r_{max})) - 1] \bmod e_{plus}\} + 1$$

for repetition (where $r \in \{0, 1, \ldots, r_{max}-1\}$ and $r_{max}$ is the total number of redundancy versions allowed).

TABLE 1

Parameters for HARQ second rate matching.

| | $X_i$ | $e_{plus}$ | $e_{minus}$ |
|---|---|---|---|
| Systematic RM S | $N_{sys}$ | $N_{sys}$ | $|N_{sys} - N_{t,sys}|$ |
| Parity 1 RM P1_2 | $N_{p1}$ | $a \cdot N_{p1}$ | $a \cdot |N_{p1} - N_{t,p1}|$ |
| Parity 2 RMP 2_2 | $N_{p2}$ | $a \cdot N_{p2}$ | $a \cdot |N_{p2} - N_{t,p2}|$ |

The number of systematic and parity bits to be transmitted is provided in Table 2.

TABLE 2

Number of transmit systematic and parity bits.

| | | S = 0 | s = 1 |
|---|---|---|---|
| Number of systematic bits transmitted | Puncturing | $N_{t,sys} = \max\{N_{data} - (N_{p1} + N_{p2})\}$ | $N_{t,sys} = \min\{N_{sys}, N_{data}\}$ |
| | Repetition | $N_{t,sys} = \left\lfloor N_{sys} \cdot \dfrac{N_{data}}{N_{sys} + 2N_{p2}} \right\rfloor$ | |
| Number of parity 1 bits transmitted | | $N_{t,p1} = \left\lfloor \dfrac{N_{data} - N_{t,sys}}{2} \right\rfloor$ | $N_{t,p1} = \left\lfloor \dfrac{N_{data} - N_{t,sys}}{2} \right\rfloor$ |
| Number of parity 2 bits transmitted | | $N_{t,p2} = \left\lceil \dfrac{N_{data} - N_{t,sys}}{2} \right\rceil$ | $N_{t,p2} = \left\lceil \dfrac{N_{data} - N_{t,sys}}{2} \right\rceil$ |

Pursuant to the embodiments set forth above, at least four algorithms for selecting the redundancy version are possible. In a preferred approach Algorithm 1 will always be used for user equipment that can support full incremental redundancy (IR). Algorithm 4 may be used instead if algorithmic complexity is a concern at the Node B. For user equipment that can only support partial IR, Algorithms 3 and 2 may be used in that order of likely preference.

Algorithm 1 determines the redundancy version based on a tradeoff calculation between the number of transmitted coded bits and the potential gain in the effective coding rate. Due to the nature of the rate-matching algorithm, it is usually not possible to transmit unique coded bits in subsequent re-transmissions. In addition, it was found that the choice of r (r=0, …, $r_{max}$–1) does not significantly affect the effective coding rate of the (n+1)-th transmission in most cases. Based on these observations, Algorithm 1 first estimates the potential gain in the effective coding rate if parity bits are emphasized (s=0) in the re-transmission. If the gain is small relative to the number of bits to be transmitted, then the re-transmission emphasizes systematic bits (s=1) instead.

Algorithm 1—Adaptive Redundancy Version Selection

1. Set s=1 and r=0 for the first transmission. Let $N_{data}(1)$ represent the number of data bits to be used for the HS-DSCH. Note that $N_{data}(1)$ depends on the number of codes assigned to this user and the modulation selection. Calculate the effective coding rate for this transmission as follows:

$$ecr(1) = \frac{N_{info}}{N_{t,sys}(1) + N_{t,p1}(1) + N_{t,p2}(1)}$$

where $N_{t,sys}(1), N_{t,p1}(1)$, and $N_{t,p2}(1)$ are determined from Table 2.

2. For the n-th re-transmission (n=2,3, …, $N_{max}$), given $N_{data}(n)$, the number of coded data bits to be transmitted for this transmission, let $x = N_{data}(n)$ and calculate $$ecr\_r(n) = A_0(x) \times \log(ecr(n-1)) + B_0(x)$$

Note that the coefficients $A_0(x)$ and $B_0(x)$ are dependent on $N_{data}(n)$ at the n-th transmission, and that their values are determined a-priori.

3. If $ecr(n-1) \leq ecr\_threshold$ or $$\left(\frac{N_{data}(n)}{N_{info}}\right) \geq \alpha \times \left|\frac{1}{ecr\_r(n)} - \frac{1}{ecr(n-1)}\right|$$

then set s=1, else set s=0.

4. Set $r = ((r+1) \bmod r_{max})$. Select $X_{rv}$ that maps to the chosen s and r parameters.

5. Update the effective coding rate as follows:

$$ecr(n) = \frac{N_{info}}{\tilde{N}_{sys} + \tilde{N}_{p1} + \tilde{N}_{p2}}$$

where $\tilde{N}_{sys}, \tilde{N}_{p1}$, and $\tilde{N}_{p2}$ are the number of unique systematic, parity 1, and parity 2 bits. In the case that the Node B does not keep track of the bits transmitted, the effective coding rate may be estimated as follows:

$$ecr(n) = \begin{cases} ecr\_r(n) & \text{if } s = 0 \\ A_1(x) \times \log(ecr(n-1)) + B_1(x) & \text{if } s = 1 \end{cases}$$

where the coefficients $A_1(x)$ and $B_1(x)$ describe the relationship between the current and future effective coding rates for s=1.

This adaptive algorithm typically requires knowledge of the relationship between the current and future effective coding rates (i.e., knowledge of $A_0(x), A_1(x), B_0(x)$, and $B_1(x)$). Without this information, one can select the redundancy version according to the methods described below.

Algorithm 2—Chase
1. Set s=1 and r=0 for all transmissions.
Algorithm 3—Partial IR
1. For the n-th transmission (n=1,2,3, . . . , $N_{max}$), set s=1 and r=((n−1) mod $r_{max}$).
Algorithm 4—Incremental Redundancy
1. Set s=1 and r=0 for the first transmission. Calculate the number of systematic and parity bits transmitted as follows:

$$T_{sys}=N_{t,sys}(1) \text{ and } T_{par}=N_{t,p1}(1)+N_{t,p2}(1).$$

2. For the n-th re-transmission (n=2,3, . . . , $N_{max}$), calculate the ratio $$\kappa = \frac{T_{sys} + \min(N_{sys}, N_{data}(n))}{T_{par} + N_{data}(n) - \min(N_{sys}, N_{data}(n))}$$

3. If $\kappa \leq \beta$ then set s=1, else set s=0. Calculate $N_{t,sys}(n)$, $N_{t,p1}(n)$, and $N_{t,p2}(n)$ according to Table 2 and update the following variables:

$$T_{sys}=T_{sys}+N_{t,sys}(n) \text{ and } T_{par}=T_{par}+N_{t,p1}(n)+N_{t,p2}(n).$$

Set r=((r+1) mod $r_{max}$). Select $X_{r,v}$ that maps to the chosen s and r parameters.

Those skilled in the art will appreciate that these teachings facilitate examination of a tradeoff, in terms of the effective coding rate, between transmitting systematic and parity bits, and further facilitates selection of appropriate s and r parameters in contexts such as the one just presented. These embodiments are adaptive and can readily handle different transmit packet sizes and modulations between re-transmissions as well.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, if desired, the above-described first parameter, when comprising an indicator regarding the self-decodability of the corresponding packet, can be automatically set when the apparatus operates in a soft-handover state. This ensures reliable reception of the information packet at the periphery of the cell where the propagation condition is usually poor.

We claim:

1. A method for use in a high speed downlink packet access communication system that supports a plurality of redundancy variations that are characterized by at least a first parameter that comprises an indicator regarding self-decodability of a corresponding packet and a second parameter that comprises a selection of a particular redundancy version from amongst a plurality of candidate redundancy versions, the method comprising:
transmitting at least a first packet;
determining a need to transmit redundant information as corresponds to the first packet;
automatically selecting, for at least one of the first and second parameters, a specific value from amongst a plurality of candidate values;
using the specific value to transmit the redundant information.

2. The method of claim 1 wherein transmitting at least a first packet comprises transmitting at least a first packet that comprises both information bits and parity bits as correspond to the information bits.

3. The method of claim 2 wherein automatically selecting, for at least one of the first and second parameters, a specific value from amongst a plurality of candidate values further comprises selecting the specific value as a function, at least in part, of a desired ratio of parity bits to coded bits as comprise the information and parity bits.

4. The method of claim 1 wherein determining a need to transmit redundant information as corresponds to the first packet further comprises receiving a corresponding hybrid-automatic repeat request message.

5. The method of claim 1 wherein automatically selecting, for at least one of the first and second parameters, a specific value from amongst a plurality of candidate values further comprises automatically selecting for both of the first and second parameters specific values from amongst corresponding pluralities of candidate values.

6. The method of claim 1 wherein automatically selecting, for at least one of the first and second parameters, a specific value from amongst a plurality of candidate values further comprises determining effective coding rates as will likely correspond to use of various of the plurality of candidate values.

7. The method of claim 6 wherein automatically selecting, for at least one of the first and second parameters, a specific value from amongst a plurality of candidate values further comprises selecting a specific value that represents a most efficient trade-off between a decrease in the effective coding rate relative to an amount of transmitted bits.

8. The method of claim 7 wherein automatically selecting, for at least one of the first and second parameters, a specific value from amongst a plurality of candidate values further comprises:
automatically selecting for the first parameter a first specific value from amongst a plurality of candidate values that represent a most efficient trade-off between a decrease in the effective coding rate relative to an amount of transmitted bits;
automatically selecting for the second parameter a second specific value from amongst a plurality of candidate values by incrementing from a previous value to provide an incremented value.

9. The method of claim 8 wherein automatically selecting for the second parameter a second specific value from amongst a plurality of candidate values by incrementing from a previous value further comprises, when the incremented value is greater than a maximum possible value, selecting the second parameter as a function of a remainder that remains upon dividing the incremented value by the maximum possible value.

10. The method of claim 8 wherein using the specific value to transmit the redundant information further comprises using the first specific value and the second specific value to transmit the redundant information.

11. The method of claim 1 wherein the high speed downlink packet access communication system further comprises a wireless high speed downlink packet access communication system.

12. An apparatus for use in a high speed downlink packet access communication system that supports a plurality of redundancy variations that are characterized by at least a first parameter that comprises an indicator regarding self-decodability of a corresponding packet and a second parameter that comprises a selection of a particular redundancy version from amongst a plurality of candidate redundancy versions, the apparatus comprising:

a transmitter;

a scheduler with a hybrid-automatic repeat request interface operably coupled to the transmitter;

redundant packet formation means responsive to the hybrid-automatic repeat request interface of the scheduler and having an output operably coupled to the transmitter for automatically selecting, for at least one of the first and second parameters, a specific value from amongst a plurality of candidate values and using the specific value when transmitting redundant information via the transmitter.

13. The apparatus of claim 12 wherein the transmitter comprises transmission means for transmitting at least a first packet that comprises both information bits and parity bits as correspond to the information bits.

14. The apparatus of claim 13 wherein automatically selecting, for at least one of the first and second parameters, a specific value from amongst a plurality of candidate values further comprises selecting the specific value as a function, at least in part, of a desired ratio of parity bits to coded bits as comprise the information and parity bits.

15. The apparatus of claim 12 wherein automatically selecting, for at least one of the first and second parameters, a specific value from amongst a plurality of candidate values further comprises automatically selecting for both of the first and second parameters specific values from amongst corresponding pluralities of candidate values.

16. The apparatus of claim 12 wherein automatically selecting, for at least one of the first and second parameters, a specific value from amongst a plurality of candidate values further comprises determining effective coding rates as will likely correspond to use of various of the plurality of candidate values.

17. The apparatus of claim 16 wherein automatically selecting, for at least one of the first and second parameters, a specific value from amongst a plurality of candidate values further comprises selecting a specific value that represents a most efficient trade-off between a decrease in the effective coding rate relative to an amount of transmitted bits.

18. The apparatus of claim 17 wherein automatically selecting, for at least one of the first and second parameters, a specific value from amongst a plurality of candidate values further comprises:

automatically selecting for the first parameter a first specific value from amongst a plurality of candidate values that represents a most efficient trade-off between a decrease in a corresponding effective coding rate relative to an amount of transmitted bits.;

automatically selecting for the second parameter a second specific value from amongst a plurality of candidate values by incrementing from a previous value to provide an incremented value.

19. The apparatus of claim 18 wherein automatically selecting for the second parameter a second specific value from amongst a plurality of candidate values by incrementing from a previous value further comprises, when the incremented value is greater than a maximum possible value, selecting the second parameter as a function of a remainder that remains upon dividing the incremented value by the maximum possible value.

20. The apparatus of claim 18 wherein using the specific value when transmitting redundant information via the transmitter further comprises using the first specific value and the second specific value when transmitting redundant information via the transmitter.

21. The apparatus of claim 12 wherein high speed downlink packet access communication system further comprises a wireless high speed downlink packet access communication system.

22. The apparatus of claim 12 wherein a first parameter that comprises an indicator regarding self-decodability is automatically set when a receiver is in soft-handover status.

* * * * *